Aug. 26, 1924.

H. H. LOHMEYER

DISK HARROW

Filed March 9, 1923   2 Sheets-Sheet 1

1,506,595

Witness:
E. H. Wagner

Inventor
H. H. Lohmeyer
By Robb, Robb & Hill
Attorneys

Aug. 26, 1924.
H. H. LOHMEYER
DISK HARROW
Filed March 9, 1923  2 Sheets-Sheet 2
1,506,595
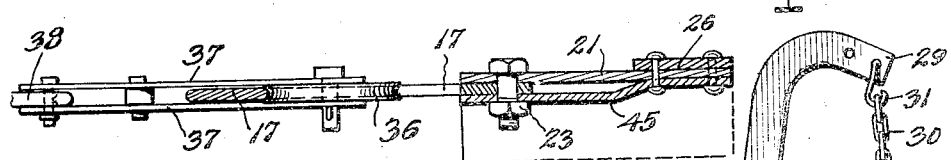
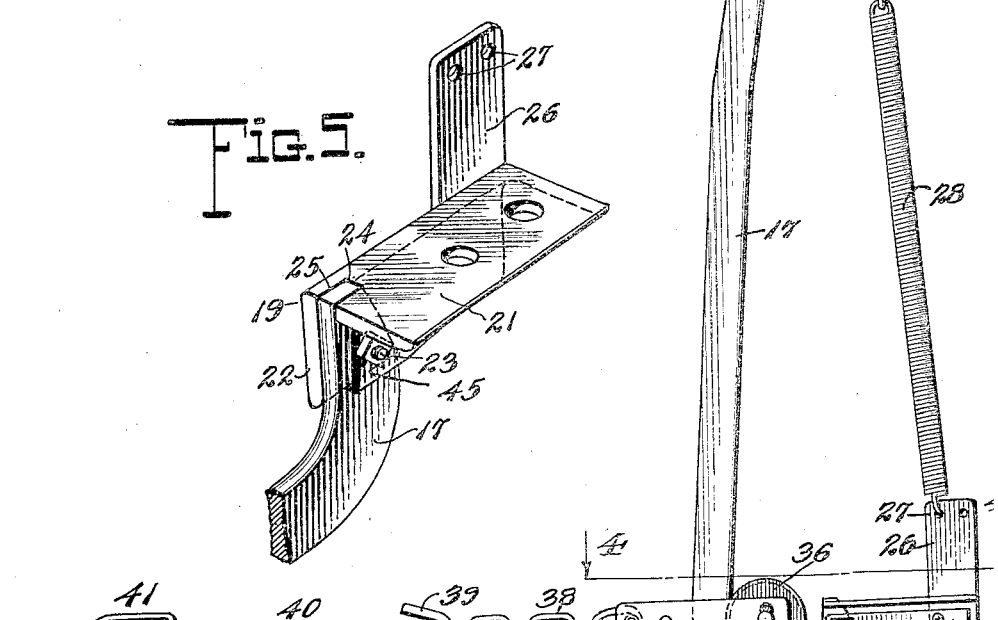
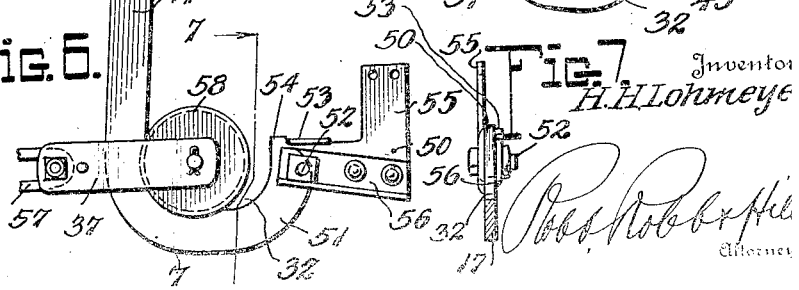
Witness:
C. H. Wagner,
Inventor
H. H. Lohmeyer Patented Aug. 26, 1924.

1,506,595

UNITED STATES PATENT OFFICE.

HENRY H. LOHMEYER, OF AMBROSE, NORTH DAKOTA.

DISK HARROW.

Application filed March 9, 1923. Serial No. 623,918.

*To all whom it may concern:*

Be it known that I, HENRY H. LOHMEYER, a citizen of the United States, residing at Ambrose, in the county of Divide and State of North Dakota, have invented certain new and useful Improvements in Disk Harrows, of which the following is a specification.

This invention relates to a disk harrow and particularly to a construction comprising a multiple of gangs in tandem arrangement.

In the prior art the resistance in the turning movement of the harrow due to the endwise pressure upon the disk gangs has proven a serious disadvantage in practical application and it has also been found important to secure a normal rigid draft connection between the gangs as, if loosely connected to permit turning movement, they cannot be properly controlled and held in their angular relation to the line of draft.

The present invention has for an object to provide a draft connection between the gang harrows which is practically rigid under normal conditions but adapted to yield under abnormal conditions, such as in turning in the field, and such yielding may be effected either automatically by the strain of the draft connection or manually by a manipulation of such connections.

A further object of the invention is to provide an improved form of draft connection between the front and rear harrow gangs comprising a pivoted lever having a seat at opposite ends adapted to receive a draft member said lever being yieldably supported in its normal position but adapted to change its position to permit the draft member to travel from one to the other seat thereon.

Another object of the invention is to provide means for mounting the draft connection between the harrow gangs to permit its relative adjustment and also the adjustment of the tension by which the lever member thereof is held in normal position.

Other and further objects and advantages of the invention will be hereinafter set forth and the novel features thereof defined by the appended claims.

In the drawings:

Figure 3 is a similar view from the opposite side to Figure 1.

Figure 4 is a detail section on line 4—4 of Figure 3.

Figure 5 is a detail perspective of the mounting bracket for the draft lever.

Figure 6 is a detail elevation of a modified form of this bracket.

Figure 7 is a section on line 7—7 of Figure 6.

Like numerals refer to like parts in the several figures of the drawings.

Figure 1:
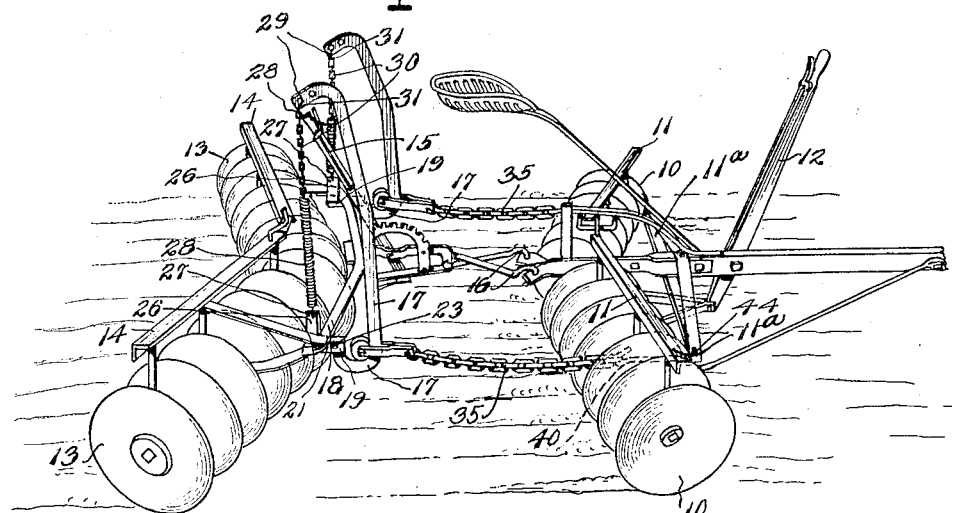
Figure 1 is a perspective showing the invention applied.

The invention is applicable to any construction or arrangement of a gang harrow and for the purpose of illustration is shown in connection with gangs of disk harrows 10 carried by frames 11 and forming a front unit, these frames being mounted in the usual manner for pivotal movement and adjustment relative to the line of draft by means of a lever 12. The rear unit comprises gangs of disks 13 carried by frames 14 and controlled similarly to the front gangs by a lever 15. The front and rear gangs are connected for relative pivotal movement by any ordinary means as indicated at 16.

Upon one of the gang units, for instance the rear gang, a draft lever 17 is mounted in any desired manner, preferably upon the frame 18 of the harrow gang by means of a bracket 19 which may be of varied construction and is secured to the frame by bolts 20 or other suitable devices. The bracket 19 comprises a horizontal plate 21 for bolting to the harrow frame and a vertical plate 22 upon which the draft lever 17 is pivoted as at 23 and the rearward swing of this lever is controlled by an abutment 24 at the base of a recess in the plate 21 which is entered by the end 25 of the lever. Attached to the bracket is a vertical plate 26 provided with apertures 27 for the adjustable connection of a restoring tension spring 28 which extends to the opposite end 29 of the lever and may be connected thereto by any suitable means such as the chain section 30 engaging a hook 31. By changing the engagement of the chain links with this hook the tension of this spring may be adjusted and the same result may be also effected by the changing of the lower end of the spring from one of the eyes 27 to the other.

The lever 17 is formed adjacent to its pivotal end with a seat 32 and at its opposite end with a corresponding seat 33 the intervening inner face thereof comprising a track 34 adapted to be traversed by means carried by a draft connection 35.

Figure 2:
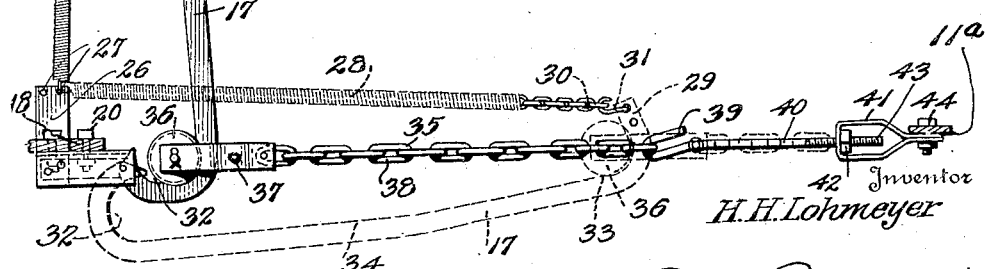
Figure 2 is an enlarged detail elevation thereof.

This connection may be of any preferred character but is herein shown as comprising a roller 36 connected by opposite plates 37 with a chain section 38 which at its opposite end is adjustably secured to a hook 39 carried by a rod 40 which is adjustably mounted in a securing yoke 41 by means of a nut 42 upon the threaded end 43 of the rod. This yoke 41 may be secured to the harrow frame connection 11$^a$ by a bolt 44 as shown in Figure 2. This form of draft connection provides for an adjustment of the rod and also for the chain links upon the rod in establishing the normal angular relation between the gangs of harrows.

If desired, a keeper plate 45 may be used upon the bracket to embrace the pivot 23 of the lever and this lever may also be formed with a connection 46 for its manual operation by the driver of the harrow if so desired, particularly in its use with a tractor, and such manual actuation does not affect its automatic operation under increased tension when turning the implement.

In Figures 6 and 7 a modified form of attaching the bracket for the draft lever is shown and comprises a plate 50 upon which the lever 51 is pivoted at 52, this plate being provided with a lateral flange 53 forming a stop or abutment for the pivotal end 54 of the lever. The plate 50 also has a vertical extension 55 for the spring attachment and a keeper plate 56 similar to the plate 45 in Figure 3. The draft connection 57 is also provided with a roller 58 adapted to rest in the seats of the draft lever as previously described.

In the operation of the invention with the parts in the position shown in Figures 1 and 2, the harrow gangs operate in the usual manner and the draft connection between them establishes their normal relation relative to the line of draft. In this position the roller from the draft connection rests in the seat at the pivotal end of the lever and the strain being against the vertical arm of the lever these parts are maintained in normal position, assisted by the tension of the connecting spring. When it is desired to turn the implement the increased tension upon the draft connection between the front and rear gangs swings the lever forward, as indicated by dotted lines in Figure 2, and the roller passes to the seat at the opposite end of the lever where a rigid draft connection is again secured, the distance between the harrow gangs being increased equivalent to the length of the lever.

As soon as the abnormal strain incident to the turning movement is relieved the tension spring at once restores the lever to its normal position so that the operation of the yielding draft connection is entirely automatic in its application and restoration. If desired, however, it may be manually operated by the driver of the implement through a connection for that purpose, as if given a limited movement forward the roller and draft connection will complete the operation without awaiting the development of sufficient strain to automatically operate the device. Means have been provided to limit the rearward movement of the lever under its spring tension so that such tension may be adjusted and determined to secure the most convenient and effective operation of the invention. This draft connection also prevents and resists any swinging motion of the gang sections upon their central pivotal coupling and effects greater efficiency in the use of the tandem arrangement, relieving the strain both upon the horses and the driver.

While the details of this invention have been specifically shown and described, it is not confined thereto, as changes and alterations may be made therein without departing from the spirit of the invention.

Having thus described my invention, what I claim as new and desire by secure by Letters Patent, is:

1. In a harrow, the combination with front and rear gang frames, of means pivotally mounting said frames at one end, and normally rigid draft means intermediate of said frames constructed to flex upon abnormal tension thereon and extend the length of the draft means in the line of draft.

2. In a harrow, the combination of front and rear gang frames, means for pivotally mounting one end of said frames, a resilient draft connection between said frames adapted to maintain a rigid connection of normal length, and means for releasing said rigid connection upon abnormal tension between the gang frames to extend the length of the draft connection.

3. In a harrow, the combination with front and rear gang frames, means for pivotally mounting one end of said frames, a resilient draft connection between the frames, and means for automatically extending and retracting the length of said connection.

4. In a disk harrow, the combination with front and rear gang frames, of means for pivotally mounting one end of said frames, a draft lever mounted upon one of the frames and provided with seats at its opposite ends, and a connection from the other gang frame disposed in one of said seats and adapted to travel to the opposite seat as the gangs are separated.

5. In a disk harrow, the combination with front and rear gang frames, of means for pivotally mounting one end of said frames, a draft lever mounted upon one of the frames and provided with seats at its opposite ends, a connection from the other gang frame disposed in one of said seats and adapted to travel to the opposite seat as the gangs are separated, and resilient means for maintaining and restoring said lever.

6. In a disk harrow, the combination with front and rear gang frames, of means for pivotally mounting one end of said frames, a draft lever mounted upon one of the frames and provided with seats at its opposite ends, a connection from the other gang frame disposed in one of said seats and adapted to travel to the opposite seat as the gangs are separated, resilient means for maintaining and restoring said lever, and means for adjusting the tension of said resilient means.

7. In a disk harrow, the combination with front and rear gang frames, of means for pivotally mounting one end of said frames, a draft lever mounted upon one of the frames and provided with seats at its opposite ends, a connection from the other gang frame disposed in one of said seats and adapted to travel to the opposite seat as the gangs are separated, resilient means for maintaining and restoring said lever, means for adjusting the tension of said resilient means, and means for adjusting the length of said draft connection.

8. In a disk harrow, the combination with front and rear gang frames, of a draft lever pivotally mounted at its lower end upon one of said frames and provided with seats at its opposite ends, a draft connection provided with a roller normally disposed in one of said seats and adapted to travel upon the lever to the opposite seat, and a tension device extending from the upper end of said lever to normally maintain the same in vertical position.

9. In a disk harrow, the combination with front and rear gang frames, of a draft lever pivotally mounted at its lower end upon one of said frames and provided with seats at its opposite ends, a draft connection provided with a roller normally disposed in one of said seats and adapted to travel upon the lever to the opposite seat, and a tension spring extending from the upper end of said lever to a fixed support carried by the gang frame.

10. In a disk harrow, the combination of front and rear gang frames, a supporting bracket secured to one of said frames, a draft lever pivotally mounted upon said bracket and provided with curved seats at its opposite ends and an intermediate track, tension means extending from the free end of said lever, an upright from said bracket to which said tension means is attached, and a draft connection from the other gang frame adapted to rest in said seats and traverse said track.

11. In a disk harrow, the combination of front and rear gang frames, a supporting bracket secured to one of said frames, a draft lever pivotally mounted upon said bracket and provided with curved seats at its opposite ends and an intermediate track, tension means extending from the free end of said lever, an upright from said bracket to which said tension means is attached, a draft connection from the other gang frame adapted to rest in said seats and traverse said track, and a stop portion carried by said lever and adapted to engage an abutment upon said bracket to limit the rearward movement of said lever under said tension means.

12. In a disk harrow, the combination with front and rear gang frames, of a yieldingly mounted draft lever supported upon one of said frames, a connection comprising a yoke secured to the opposite gang frame, a hook adjustably mounted in said yoke, a keeper carrying a pivoted roller to traverse said draft lever, and a link connection between said keeper and hook.

13. In a disk harrow, the combination of front and rear gang frames, a supporting bracket secured to one of said frames and comprising angle plates with a vertical upright therefrom, a draft lever pivoted to the vertical plate of said bracket and having its pivoted end disposed within an abutting recess in a horizontal plate of the bracket, tension means extending from the free end of said lever to said upright, and a draft connection from the opposite gang frame to said lever.

14. In a disk harrow, the combination of front and rear gang frames, a draft lever pivotally mounted upon one of said frames, tension means for maintaining said lever in substantially vertical position, and a draft connection from the opposite gang frame normally engaging at one end of said lever and disposed to shift said lever to a horizontal position under abnormal strain and then engage the opposite end thereof, whereby the distance between said gang frames is increased.

15. In a harrow, the combination with front and rear gang frames, an adjustable draft device mounted upon one of the frames and adapted under abnormal conditions to increase the distance between said frames, a connection between the opposite frame and said device, and means for resiliently maintaining and restoring said device to normal position.

In testimony whereof I affix my signature.

HENRY H. LOHMEYER.